May 22, 1951 G. C. LONG 2,554,040
ROTARY PLUG VALVE
Filed April 3, 1945 2 Sheets-Sheet 1

Inventor
GROVER C. LONG
By Bernard F. Garvey
Attorney

May 22, 1951 G. C. LONG 2,554,040
ROTARY PLUG VALVE
Filed April 3, 1945 2 Sheets-Sheet 2

Inventor
GROVER C. LONG
By Bernard F. Garvey
Attorney

Patented May 22, 1951

2,554,040

UNITED STATES PATENT OFFICE 2,554,040

ROTARY PLUG VALVE

Grover C. Long, Washington, D. C.

Application April 3, 1945, Serial No. 586,353

3 Claims. (Cl. 251—92)

The present invention consists of a micrometer valve especially adapted for the control of oil flow to burners, but may be advantageously used for the control of other liquids and fluids in a manner which will be apparent to those skilled in the art.

Among the objects of this invention are the provision of an inside packing which eliminates the necessity for the cumbersome external stuffing box; yet positively retains the packing in a state of compression; to provide a valve plug with separate removable orifice plates, the sizes of the orifices varying to complement any desired capacity range, within the dimensions of the pipes supplying the valve casing, providing a flexible arrangement whereby liquids of variable viscosity are accommodated as are liquids and fluids under differential pressure conditions; and to provide a compact valve employing the desirable tapered plug which may be operated either manually or mechanically.

It is further within the contemplation of this invention to provide a valve embodying a tapering plug which, although mounted on anti-friction bearings, is equipped with a leak-proof packing constantly urged into engagement with the plug, yet permitting a micrometer adjustment of the latter, suitable means being also provided to effectively hold the plug in any predetermined position of adjustment.

Other objects of the invention will be apparent from the following description of the present preferred form of the invention, taken in connection with the accompanying drawings, wherein Figure 1 is a front elevational view of a valve constructed in accordance with the present invention, a part thereof being broken away to disclose details;

Figure 1:
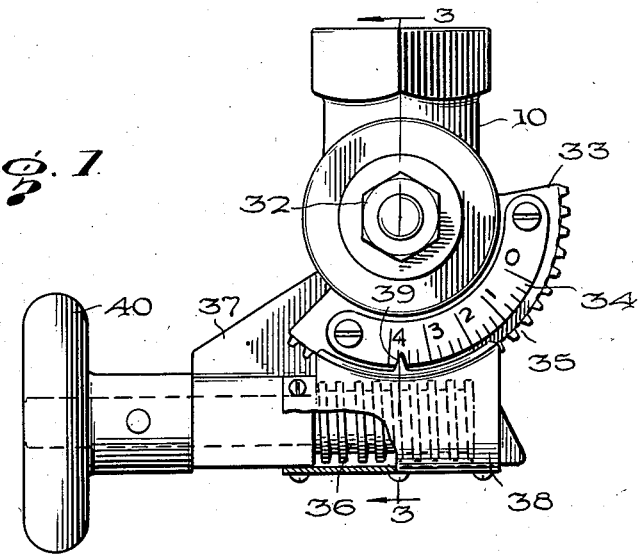
Figure 2:
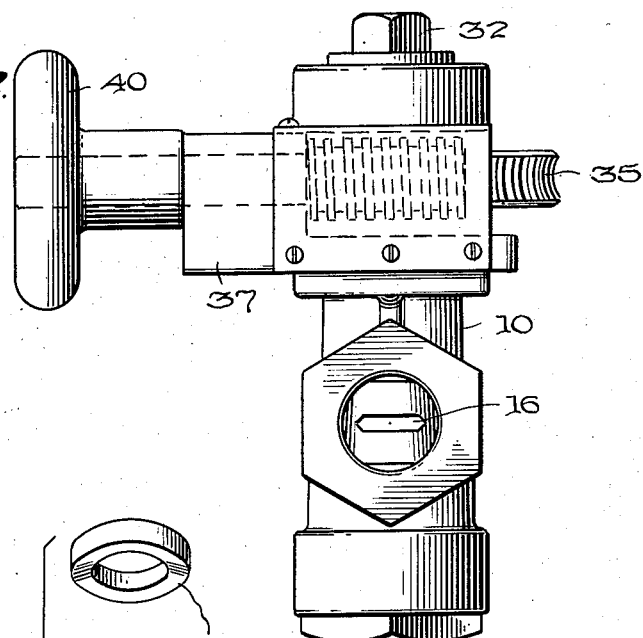
Figure 2 is a bottom plan view of the same.
Figure 8:
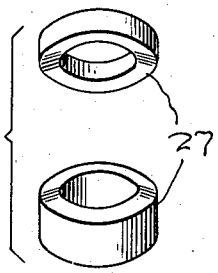
Figure 8 is a perspective view of the complemental packing washers of this invention.
Figure 3:
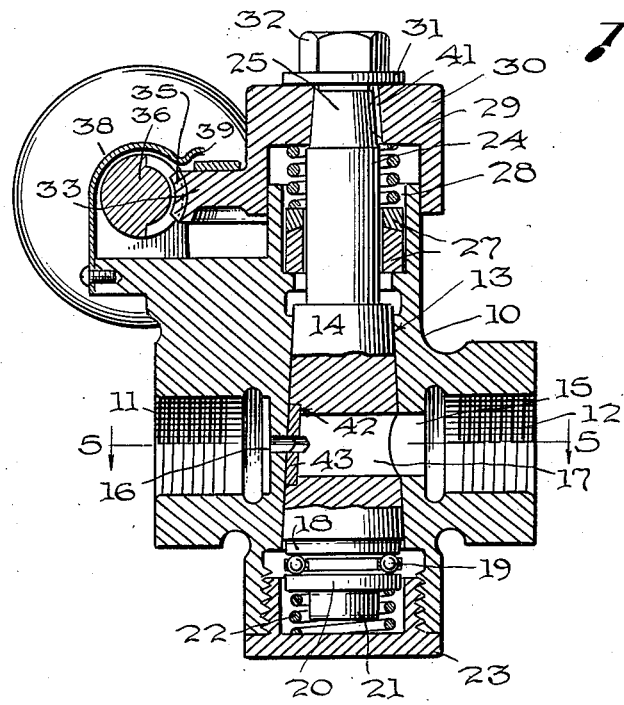
Figure 3 is a sectional view taken on the line 3—3 of Figure 1, looking in the direction of the arrows, with parts being shown fragmentarily.
Figure 4:
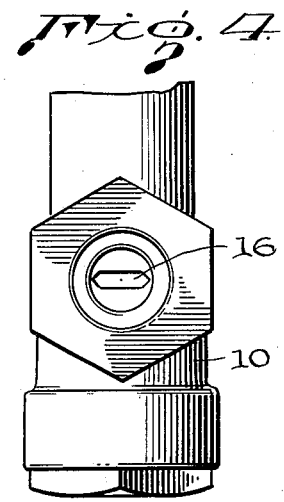
Figure 4 is a fragmentary bottom plan view of the casing.
Figure 5:
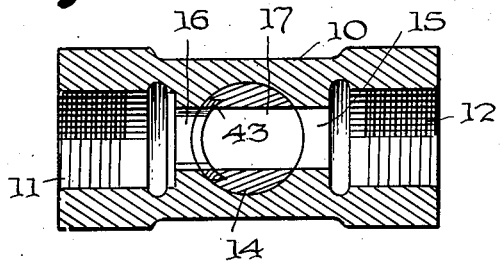
Figure 5 is a cross sectional view taken on the line 5—5 of Figure 3, looking in the direction of the arrows, the valve being shown in a fully opened position.
Figure 7:
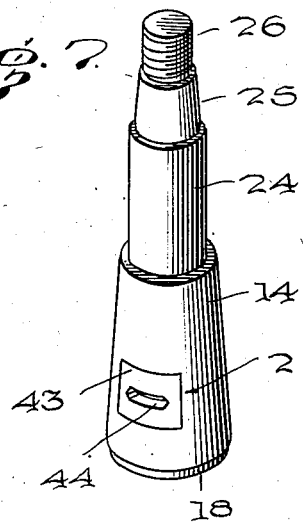
Figure 7 is a perspective view of the plug forming a part of the present invention.
Figure 6:
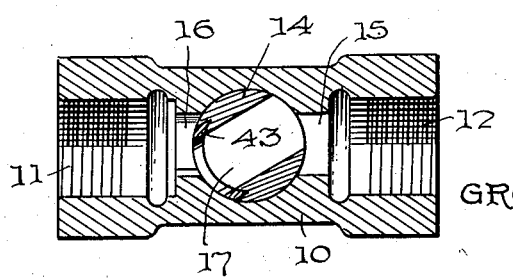
Figure 6 is a similar view showing the valve in a partly opened position.

The present invention includes a casing 10 provided with inlet and outlet openings 11 and 12 respectively. The casing is also provided with an opening 13 at right angles to the openings 11 and 12, which is tapered for the reception of a complementally formed plug 14. Upon reference to Figure 3 of the drawing, it will be noted that the inner ends of the openings 11 and 12 communicate with a constricted opening 15 in the casing. The inlet end of said opening 15 is closed except for a slot 16 which communicates with the inlet opening 11 through an opening 17 in the plug 14. The slot 16 opens into the opening 11 in an obvious manner. The enlarged end of the plug 14 is reduced, as indicated at 18 and is provided with a ball race equipped with ball bearings or the like 19. A floating disc 20 forms one side of the ball race and is provided with a depending shank 21 about which a spring 22 is convoluted. A cap 23 is detachably mounted in a correspondingly threaded opening in the bottom of the casing 10, as illustrated to advantage in Figure 3. The lowest convolution of the spring 22 engages the inner wall of the cap 23, permitting the expansive force of the spring to urge the disc 20 toward the valve 14. The cap 23 may be removed in an obvious manner for disassemblage of the lower part of the valve, at the option of the user.

The smaller end of the body of the plug valve 14 issues into a shank formed to provide a plurality of consecutively reduced steps 24, 25 and 26. This shank extends through the opening 13 partially beyond one end of the casing as advantageously illustrated in Figure 3. An intermediate part of the shank is circumscribed by a packing formed from a pair of complemental discs 27 which may be made of graphite-impregnated Babbitt metal or the like. The packing is compressed in a socket 28 formed in the casing by a spring 29 which, in turn, is confined by a hood 30. The hood 30 is slidably engaged over the end of the casing in which the socket 28 is formed and provided with an opening which complements the part 25 of the shank. The threaded end 26 of the shank extends beyond the hood 30 and carries a washer 31 and nut 32. The nut 32 prevents displacement of the hood 30 and correspondingly retains the packing washer 27 in yieldable engagement with the shank portion 25 of the plug. The hood 30 is provided with a peripheral enlargement 33, the outer face of which is calibrated as indicated at 34. Preferably the enlargement 33 is of segmental construction and the periphery thereof formed to provide a rack bar 35. The rack bar is interengaged by a worm shaft 36, the shaft being rotatably mounted in a bearing plate 37 formed on the casing 10. The bearing plate includes a housing 38 which is engaged over the worm shaft 36 and has a portion thereof formed to provide an indicator finger 39. One end of the worm shaft 36 carries a handle 40 which may be of any desired size and shape.

Rotation of the handle 40 correspondingly rotates the shaft 36 which, in turn, imparts movement to the segment 33, rotating the hood 30 and correspondingly operating the valve 14 to which the hood is keyed, as indicated at 41.

The body of the plug 14 is provided with a recess 42 which is adapted for the reception of a complemental orifice plate 43, the plate being provided with an elongated opening 44, the ends of which are V-shaped. It will be noted that the ends of the slot 16 in the casing 10 are likewise V-shaped, consequently it is possible to effect a pin-point opening at the ends of the slot 16 if and when desired. Furthermore, the peculiar shape of the openings 16 and 44 eliminates the possibility of minute particles of dirt, grit and foreign material bridging over the aperture, effecting a stoppage or partial stoppage of the flow of liquid or fluid through the valve when it is partially open.

With this construction, I have found that an infinitesimal adjustment of the valve opening is permitted which correspondingly permits only a minimum volume of liquid or fluid to pass through the valve and the valve retained without any variation, in this position, for an indefinite period of time. Correspondingly I have found that by use of the removable orifice plate in the valve plug, that the size of the opening for discharge of the fluid or liquid may be varied to better adapt the valve for liquids and fluids varying in viscosity and density, with due consideration for pressure differential. The orifice plate may be expeditiously changed, pursuant to removal of the valve plug 14 in an obvious manner. With the inside packing, I have found that the performance of the valve is equally as good as with an outside stuffing box and it is possible to utilize a more compact valve casing with a lesser number of parts.

I have herein described a preferred embodiment of my invention, but I am of course aware that various changes may be made therein, especially in the details of construction, proportion and arrangement of parts, within the scope of the claims hereto appended.

What I claim is:

1. A valve including a casing provided with inlet and outlet openings, a tapered plug mounted in the casing and intersecting said openings, the plug being provided with an opening to permit communication to be established between said inlet and outlet openings, a wall at the inner end of said inlet opening, the wall being provided with a slot, the ends of which are V-shaped, and an orifice plate mounted in said plug over the opening of the latter, the ends of the orifice being V-shaped to complement the shape of the casing slot.

2. In a valve of the class described, a casing having inlet and outlet openings, the casing being provided with a wall portion in the inlet opening, said wall portion being provided with a slot having V-shaped ends, a plug rotatably mounted in said casing and provided with a through transverse opening, and an orifice plate mounted on the plug at one end of the through opening and provided with a slot for movement with the plug into and out of registry with the slot first mentioned, the slot in said orifice plate having V-shaped ends to complement the ends of the first mentioned slot.

3. A valve including a casing provided with inlet and outlet openings, the inner end of the inlet opening being closed except for a slot the ends of which are V-shaped, a tapered plug mounted in the casing between said openings to normally close communication through the latter, the plug being provided with an opening, operable into alignment with the inlet and outlet openings of the casing, and a plate mounted in the plug over the opening of the latter, the plate having a slot with V-shaped ends to complement the slot in the closed inner end of the casing inlet opening.

GROVER C. LONG.

REFERENCES CITED

The following references are of record in the file of this patent:

UNITED STATES PATENTS

| Number | Name | Date |
|---|---|---|
| 727,743 | Brunner | May 12, 1903 |
| 826,536 | Butterfield | July 24, 1906 |
| 1,008,097 | Winnow | Nov. 7, 1911 |
| 1,072,812 | Bertram | Sept. 9, 1913 |
| 1,133,764 | Volk | Mar. 30, 1915 |
| 1,152,026 | Kimball | Aug. 31, 1915 |
| 1,454,222 | Palmer | May 8, 1923 |
| 1,534,866 | Page | Apr. 21, 1925 |
| 1,638,152 | Gabriel | Aug. 9, 1927 |
| 1,674,743 | Rudolph | June 26, 1928 |
| 1,898,147 | Smith | Feb. 21, 1933 |
| 1,931,048 | Wiener | Oct. 17, 1933 |
| 2,115,675 | Tremmel | Apr. 26, 1938 |

FOREIGN PATENTS

| Number | Country | Date |
|---|---|---|
| 23,320 | Great Britain | Oct. 13, 1909 |